(12) United States Patent
Wilkins et al.

(10) Patent No.: US 11,795,636 B2
(45) Date of Patent: Oct. 24, 2023

(54) SYSTEMS AND METHODS FOR MAKING THERMOPLASTIC PRODUCTS AND COMPOSITIONS

(71) Applicant: Ennis-Flint, Inc., Greensboro, NC (US)

(72) Inventors: Vince Wilkins, Smyrna, GA (US); Paul Seropian, Salisbury, NC (US); Russell Huff, Harrisburg, NC (US); Maxwell Heavner, Greensboro, NC (US); Nathan Hoover Cross, Greensboro, NC (US)

(73) Assignee: Ennis-Flint, Inc., Greensboro, NC (US)

( * ) Notice: Subject to any disclaimer, the term of this patent is extended or adjusted under 35 U.S.C. 154(b) by 609 days.

(21) Appl. No.: 16/864,361

(22) Filed: May 1, 2020

(65) Prior Publication Data
US 2020/0347562 A1   Nov. 5, 2020

Related U.S. Application Data

(60) Provisional application No. 62/842,847, filed on May 3, 2019.

(51) Int. Cl.
*E01F 9/512* (2016.01)
*C08K 3/013* (2018.01)
(Continued)

(52) U.S. Cl.
CPC ............. *E01F 9/512* (2016.02); *C08J 3/12* (2013.01); *C08J 5/18* (2013.01); *C08K 3/013* (2018.01); *C08K 5/005* (2013.01); *C08K 7/20* (2013.01); *C08L 23/06* (2013.01); *C08L 23/08* (2013.01); *C08L 23/14* (2013.01); *C08L 67/00* (2013.01); *C08L 75/04* (2013.01); *C08L 91/00* (2013.01); *C08L 2205/035* (2013.01)

(58) Field of Classification Search
CPC ................................ E01F 9/512; C08J 5/18
USPC ............... 523/172; 404/79, 84.05; 264/40.7; 427/137
See application file for complete search history.

(56) References Cited

U.S. PATENT DOCUMENTS

2004/0127614 A1   7/2004   Jiang et al.
2007/0244264 A1   10/2007  Granger et al.
(Continued)

FOREIGN PATENT DOCUMENTS

JP    2005 090155    4/2005
KR    200426960     9/2006

OTHER PUBLICATIONS

Belt Technologies, Inc., Blog, "How to Select the Optimal Material for Your Conveyor Belt Application," 4 pages, dated Apr. 27, 2017. (Year: 2017).*

(Continued)

*Primary Examiner* — Fred M Teskin
(74) *Attorney, Agent, or Firm* — Kilpatrick Townsend & Stockton LLP

(57) ABSTRACT

Systems and methods to produce thermoplastic products in a process are described herein. In some cases, the systems and methods may eliminate contact between the product and a heat transfer fluid. The thermoplastic compositions can be useful for roadway markings. In some examples, a formed thermoplastic product is discharged by a product formation apparatus onto a temperature controlled transporter, cooled, and cut to a desired product dimension.

20 Claims, 3 Drawing Sheets

(51) Int. Cl.

| | | |
|---|---|---|
| *C08J 3/12* | (2006.01) | |
| *C08J 5/18* | (2006.01) | |
| *C08K 5/00* | (2006.01) | |
| *C08K 7/20* | (2006.01) | |
| *C08L 23/06* | (2006.01) | |
| *C08L 23/08* | (2006.01) | |
| *C08L 23/14* | (2006.01) | |
| *C08L 67/00* | (2006.01) | |
| *C08L 75/04* | (2006.01) | |
| *C08L 91/00* | (2006.01) | |

(56) References Cited

U.S. PATENT DOCUMENTS

| | | |
|---|---|---|
| 2015/0140294 A1 | 5/2015 | Yakopson et al. |
| 2015/0314485 A1 | 11/2015 | Puffer, Sr. et al. |
| 2016/0016346 A1* | 1/2016 | Lebert .................... B29C 48/92 264/40.7 |
| 2016/0024338 A1 | 1/2016 | Puffer, Sr. et al. |
| 2016/0186396 A1* | 6/2016 | Hepler .................... E01F 9/506 523/150 |
| 2019/0055704 A1 | 2/2019 | Fasula et al. |

OTHER PUBLICATIONS

International Patent Application No. PCT/US2020/030941, Search Report and Written Opinion, 12 pages, dated Aug. 18, 2020.

\* cited by examiner

SYSTEMS AND METHODS FOR MAKING THERMOPLASTIC PRODUCTS AND COMPOSITIONS

PRIORITY

The present application claims priority to U.S. Provisional Patent Application Ser. No. 62/842,847, filed May 3, 2019, which is hereby incorporated by reference in its entirety herein.

FIELD

Described herein are systems and methods for producing a thermoplastic composition. In some aspects, the compositions described herein can be useful for roadway markings.

BACKGROUND

Thermoplastic materials are used for roadway markings and can be produced in a myriad of colors and patterns. Conventional systems for producing thermoplastics for roadway markings utilize liquid-contact heat exchange processes to cool and solidify the formed and cut thermoplastic. The liquid-contact heat exchange processes are often positioned adjacent to an extruder die and quickly solidify the thermoplastic product. This conventional arrangement often may not provide for surface application of glass beads or other materials.

SUMMARY

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Described herein are systems and methods for producing thermoplastic compositions useful for roadway markings. In some examples, a method for producing thermoplastic composition for roadway markings can comprise supplying a thermoplastic composition to a product feeder, transferring the thermoplastic composition from the feeder to a product formation apparatus, discharging a formed thermoplastic product from the apparatus onto a temperature controlled transporter, and collecting the thermoplastic product in a product collection system. In certain examples, the method can further comprise cutting the formed thermoplastic product to a dimension. In some examples, the method can further comprise adding a surface treatment of glass beads to the formed thermoplastic product. In some cases, the formed thermoplastic product can comprise a plurality of ribbons, a plurality of dots, a plurality of pellets, or a sheet. In some examples, an exterior surface of the temperature controlled transporter that contacts the product may be free of water or other heat transfer fluids. In other examples, the product may be contacted with water or other heat transfer fluids to facilitate heat transfer at the exterior surface of the temperature controlled transporter. In some examples, an interior surface of the temperature controlled transporter may be contacted with water or other heat transfer fluid.

Also described are systems to make the thermoplastic compositions described herein. In some examples, a system for producing thermoplastic material for roadway markings can comprise a product feeder configured to transfer a thermoplastic composition, a product formation apparatus configured to receive the thermoplastic composition from the feeder and discharge a formed thermoplastic product, a temperature controlled transporter configured to receive, cool, and transport the formed thermoplastic product for further processing, and a product collection system configured to receive the thermoplastic product. In some examples, the system may further comprise a cutter configured to cut the formed thermoplastic product to a dimension. In some example, the system may further comprise a glass bead dropper configured to discharge glass beads onto the formed thermoplastic product or onto the temperature controlled transporter prior to the discharge of the product formation apparatus.

The details of one or more embodiments are set forth in the description below. Other features, objects, and advantages will be apparent from the description and from the claims.

DETAILED DESCRIPTION

Figure 1:
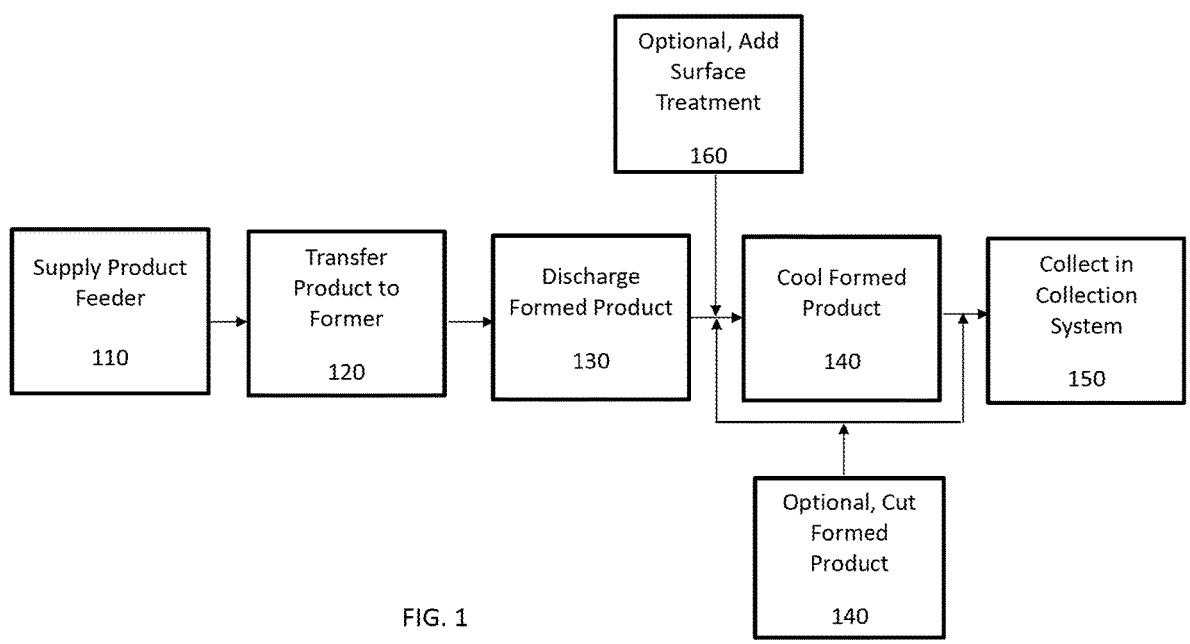
FIG. 1 is a block diagram showing a method for producing a thermoplastic composition used in roadway markings according to one example of the present disclosure.

Provided herein are methods and systems for producing thermoplastic compositions useful for roadway markings. The methods and systems can produce thermoplastics for roadway markings in a wide range of product forms. For example, the methods and systems may produce thermoplastic compositions as a plurality of ribbons, a plurality of dots, a plurality of pellets, or a sheet. For some thermoplastic compositions, the methods and systems can produce thermoplastic products with and without use of liquid-contact heat exchange processes such as a water bath or water jets.

In some cases, methods that can selectively cool and solidify formed thermoplastic products with or without use of liquid-contact heat exchange processes can improve product quality, provide for surface application of materials, and increase product offerings available. Described herein are systems and methods to produce thermoplastic markings for roadways with or without the use of liquid-contact heat exchange processes.

In some examples, a method for producing thermoplastic composition for roadway markings can comprise supplying a thermoplastic composition to a product feeder, transferring the thermoplastic composition from the feeder to a product formation apparatus, discharging a formed thermoplastic product from the apparatus onto a temperature controlled transporter, cutting the formed thermoplastic product to a dimension, and collecting the cut thermoplastic product in a product collection system.

The thermoplastic composition may be supplied from a wide-range of processes. For example, the thermoplastic composition may be supplied to the product feeder by a batch process or a continuous process that may be directly connected to the product formation process. In other examples, the thermoplastic composition may be supplied to the product feeder from containers such as supersacks, bags, or boxes.

In some examples, the thermoplastic composition may be heated prior to being supplied to the product feeder and/or the product feeder may be heated. The product feeder may be heated to a temperature of between about 150° F. and about 850° F. For example, the product feeder may be heated to a temperature of between about 150° F., 175° F., 200° F., 225° F., 250° F., 275° F., 300° F., 325° F., 350° F., 375° F., 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., or 850° F.

The thermoplastic composition may be transferred from the feeder to a product formation apparatus. In some examples, the product formation apparatus may be heated to a temperature of between about 150° F. and about 850° F. For example, the product formation apparatus may be heated to a temperature of between about 150° F., 175° F., 200° F., 225° F., 250° F., 275° F., 300° F., 325° F., 350° F., 375° F., 400° F., 425° F., 450° F., 475° F., 500° F., 525° F., 550° F., 575° F., 600° F., 625° F., 650° F., 675° F., 700° F., 725° F., 750° F., 775° F., 800° F., 825° F., or 850° F.

The product formation apparatus may produce thermoplastic products in a wide range of product forms. For example, the product forms may be a plurality of ribbons, a plurality of dots, a plurality of pellets, or a sheet. In some cases, the dimension specified may be a length as measured longitudinal to the transporter. As understood by one skilled in the art, the product may be formed as an irregular shape. The width of the product may vary as measured from a first side to a second side. The product may have a maximum width, whether regular or irregular in shape. In certain cases, the maximum width may be a diameter of the product.

In some examples, the product formation apparatus may be stationary. The product formation apparatus may have a plurality of holes, ranging in size from 0.5 mm to 100 mm in width. In some cases, the product formation apparatus may have a plurality of holes, ranging in size from 2 mm to 30 mm in width. For example, the product formation apparatus may have a plurality of holes of about 0.5 mm, 1 mm, 2 mm, 3 mm, 4 mm, 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, or 100 mm.

In some examples, the product formation apparatus may rotate and/or reciprocate. The direction of reciprocation may be substantially perpendicular to the temperature controlled transporter, i.e., up and down in relation to the transporter. The direction of reciprocation may be parallel to the temperature controlled transporter. In some cases, the reciprocation may be front-to-back or side-to-side in relation to the movement of the temperature controlled transporter. In certain examples, the product formation apparatus may be coupled with a second cutter to produce pellets or drops directly from the apparatus.

In some examples, the product formation apparatus can be an extruder. The extruder can be coupled to a die to form a desired product profile. In certain examples, the product formation apparatus may be a rotating drum with perforations. The rotation of the drum can act as a cutter to form pellets or drops directly from the apparatus. When processed in a stationary mode, rather than form drops, the drum may form wide ribbons on the transporter. The width of the ribbon may be controlled by the discharge rate and temperature of the thermoplastic composition. In some examples, the product formation apparatus may be a dropper.

In some examples, the formed product may be in the form of a ribbons. The maximum width of each ribbon can range from 0.5 mm to 100 mm. In some examples, the maximum width of each ribbon can range from 2 mm to 30 mm. In some examples, the maximum width of each ribbon can range from 4 mm to 10 mm. In some examples, the process may form 1 to 200 ribbons in parallel. The plurality of ribbons may be cut to a dimension to form pellets or dots of thermoplastic product. In some cases, the maximum width of the pellets may range from 2 mm to 30 mm. In some cases, the maximum width of the pellets may range from 0.5 mm to 100 mm.

In some examples, the formed product may be in the form of a dots. The maximum width of each dot can range from 0.5 mm to 100 mm. In some examples, the maximum width of each dot can range from 2 mm to 30 mm. In some examples, the process may form 2 to 500 dots in parallel.

In some examples, the formed product may be in the form of a sheet. The maximum width of each sheet can range from 25 mm to 1500 mm. For example, the sheet may have a width of about 25 mm, 30 mm, 35 mm, 40 mm, 45 mm, 50 mm, 60 mm, 70 mm, 80 mm, 90 mm, 100 mm, 125 mm, 150 mm, 175 mm, 200 mm, 300 mm, 400 mm, 500 mm, 600 mm, 700 mm, 800 mm, 900 mm, 1000 mm, 1100 mm, 1200 mm, 1300 mm, 1400 mm, or 1500 mm. The sheet may be cut to a dimension. In some cases, the sheet may shaped into any complex shape. For example, the sheet may be cut into symbols, letters, numbers, lines, arrows, or any other complex shape. In some examples, the sheet may be cut with a water jet or other means known to one skilled in the art.

In some examples, the product formation apparatus discharges the formed product onto a transporter or conveyer. The product may be discharged directly onto the transporter.

In some examples, the method may further comprise adding a surface treatment to the formed thermoplastic product. For example, a surface treatment of glass beads may be added to the formed thermoplastic. In certain examples, glass beads may be standard AASHTO beads of various types (Type I, Type II, Type III, Type IV, Type V, and/or Type VI). In some cases, the glass beads can be coated. In other cases, the glass beads may be uncoated. Example of coatings include moisture coating, adhesion coating, and moisture/adhesion coatings. In certain examples, a surface treatment material may be added to the transporter prior to discharge of the product so that the product is discharged onto the material on the transporter. In some such cases, the surface treatment material may be on the underside of the formed product. In certain examples, a surface treatment may be added to the product after the product has been discharged to the transporter.

In some cases, the surface treatment can improve the handling of the thermoplastic product. For example, the surface treatment can have an anti-clumping effect. In some cases, the surface treatment can include an anti-clumping agent.

In some aspects, the optional surface treatment can provide for addition of materials that were not added to the thermoplastic composition prior to product formation. In some cases, the surface treatment materials could include glass beads, glass particles, abrasion particles, grit, coatings, or chemical treatments. In some cases, the properties of the thermoplastic composition may be enhanced by the addition of surface treatment materials after product formation.

In some embodiments, the temperature of the transporter may be adjusted to control the temperature and rate of solidification of the formed product. For example, the rate of cooling may be faster for a product that does not receive surface treatment. The rate of cooling may be adjusted to control the depth of glass beads or other surface treatment material added during a drop-on surface treatment. In some aspects, the temperature controlled transporter may include a plurality of temperature zones. The zones may be heated or cooled as determined by the product properties. In some examples, the temperature of the product may be between about 32° F. and about 495° F. For example, the temperature of the product may be about 32° F., 35° F., 40° F., 45° F., 50° F., 55° F., 60° F., 65° F., 70° F., 75° F., 80° F., 85° F., 90° F., 95° F., 110° F., 115° F., 120° F., 125° F., 130° F., 135° F., 140° F., 145° F., 150° F., 155° F., 160° F., 165° F., 170° F., 175° F., 180° F., 185° F., 190° F., 195° F., 200° F., 205° F., 210° F., 215° F., 220° F., 225° F., 230° F., 235° F., 240° F., 245° F., 250° F., 255° F., 260° F., 265° F., 270° F., 275° F., 280° F., 285° F., 290° F., 295° F., 300° F., 305° F., 310° F., 315° F., 320° F., 325° F., 330° F., 335° F., 340° F., 345° F., 350° F., 355° F., 360° F., 365° F., 370° F., 375° F., 380° F., 385° F., 390° F., 395° F., 400° F., 405° F., 410° F., 415° F., 420° F., 425° F., 430° F., 435° F., 440° F., 445° F., 450° F., 455° F., 460° F., 465° F., 470° F., 475° F., 480° F., 485° F., 490° F., or 495° F.

The methods and systems described herein utilize a process where the product may optionally contact fluids and media used in heat exchange processes such as a water bath or water jets. The temperature controlled transporter may have an exterior surface that contacts the product and an interior surface that does not contact the product. In some cases, the exterior surface of the temperature controlled transporter may be free of water or other heat transfer fluids. In other cases, the product may be contacted with water or other heat transfer fluids to facilitate heat transfer at the exterior surface of the temperature controlled transporter.

The heat exchange may be achieved by applying the heat transfer fluid to the interior surface of the transporter. The interior surface of the temperature controlled transporter may be contacted with water or other heat transfer fluid to control the temperature and solidification rate of the formed thermoplastic product. The transporter may be designed to achieve a high rate of heat exchange. In some examples, the transporter may comprise steel, aluminum, copper, or other material known to those skilled in the art to achieve good heat exchange. The temperature of the transporter may be between −100° F. and 100° F. For example, the temperature of the transporter may be about −100° F., −90° F., −80° F., −70° F., −60° F., −50° F., −40° F., −30° F., −20° F., −10° F., 0° F., 10° F., 20° F., 30° F., 40° F., 50° F., 60° F., 70° F., 80° F., 90° F., or 100° F. For example, the temperature of the transporter may be between −90° F. and 90° F., −80° F. and 80° F., −70° F. and 70° F., −60° F. and 60° F., −50° F. and 50° F., −40° F. and 50° F., −30° F. and 50° F., −20° F. and 50° F., −10° F. and 50° F., 0° F. and 50° F., 10° F. and 50° F., 20° F. and 50° F., 30° F. and 50° F., 40° F. and 50° F., 35° F. to 100° F., 35° F. to 75° F., 40° F. to 70° F., or 45° F. to 65° F. In some examples, the temperature controlled transporter may include multiple heating or cooling zones.

In some embodiments, the heat transfer fluid may be in the form of a water jet applied to the interior surface and zones of the transporter. In some cases, a plurality of water jets may be applied to the interior surface and zones of the transporter. In other cases, the heat transfer medium may be in the form of nitrogen applied to the interior surface and zones of the transporter. In some cases, the heat transfer fluid may be in the form of a glycol or other heat transfer fluid to the interior surface and zones of the transporter. In certain cases, the transporter may be air cooled.

In some examples, a heat exchange fluid or medium may be applied directly to the product or to at least a portion of the exterior surface of the temperature controlled transporter. Optionally, a heat exchange fluid or medium may be applied to both an interior surface and an exterior surface of the temperature controlled transporter.

In some embodiments, the transporter can comprise a conveyer or a belt that rotates around a plurality of rollers. In some examples, the transporter can be a plurality of plates that join together to form a conveyer. The plates may be provide for a smaller turn radius. The plates may provide for improved maintenance or quality through partial replacement of defective plates. In some examples, the transporter may have a side wall to contain the formed product. In certain examples, the transporter can include a plurality of trays or buckets to contain the formed product. In some examples, the transporter can include more than one conveyer, such as to span longer distances or navigate a directional change.

In some aspects, the temperature and cooling rate of the formed product may be controlled to enable the formed product to be cut to a dimension on the transporter. The cut product may continue to be cooled on the transporter prior to collection in a product collection system. In some examples, a temperature of the thermoplastic composition in the product feeder may be greater than a temperature of the cut thermoplastic product. The product may be cut to a dimension by a reciprocating knife, cutting roll, or other means known to those skilled in the art. In some examples, the cut product may be about 2 mm to 1500 mm in dimension. For example, the cut product may be cut to a dimension of about 2 mm, 4 mm, 6 mm, 10 mm, 15 mm, 20 mm, 25 mm, 30 mm, 35 mm, 40 mm, 45 mm, 50 mm, 60 mm, 70 mm, 80 mm, 90 mm, 100 mm, 125 mm, 150 mm, 175 mm, 200 mm, 300 mm, 400 mm, 500 mm, 600 mm, 700 mm, 800 mm, 900 mm, 1000 mm, 1100 mm, 1200 mm, 1300 mm, 1400 mm, or 1500 mm. In some examples, the cut product may a roll or coil. In some cases, the dimension specified may be a length as measured longitudinal to the transporter. In some examples, the cut product may be pellets. The pellets may have a substantially cylindrical shape, rectangular shape, conical shape, spherical shape, flat and wide shape, or flat and narrow shape.

In some embodiments, the product may be in the form of a spherical pellet with average diameter of at least about 1 millimeter. In some examples, the product may be in the form of a cylinder or rod with average diameter of at least about 1 millimeter and/or an average length of at least about 1 millimeter. In some embodiments, the product may be in the form of a tablet with average diameter of at least about 1 millimeter and/or an average length of at least about 1 millimeter. In some embodiments, the product may be in the form of a coin with average diameter of at least about 1 millimeter and/or an average thickness of at least about 1 millimeter. In some embodiments, the product may be in the form of a square with average length of at least about 1 millimeter and/or an average thickness of at least about 1 millimeter. The product may be a random shape with average effective diameter of at least about 1 millimeter, for example.

For any of the product geometries, the average minimum length scale may be about 1, 2, 3, 4, 5, 6, 7, 8, 9, or 10 millimeters, or more, such as about 15, 25, 50, 75, or 100 millimeters. In these or other embodiments, the average maximum length scale may be about 1, 2, 3, 4, 5, 6, 7, 8, 9, or 10 millimeters, or more, such as about 15, 25, 50, 75, or 100 millimeters. An example is a cylinder, in which the diameter is the minimum length scale and the length (or height) is the maximum length scale.

When the minimum length scale is a diameter, the average diameter (or average effective diameter) may be at least about 1, 2, 3, 4, 5, 6, 7, 8, 9, or 10 millimeters, for example. In certain embodiments, the minimum length scale is selected from about 1 millimeter to about 9 millimeters, such as about 3 millimeters to about 6 millimeters. When the maximum length scale is a diameter, the average diameter (or average effective diameter) may be at least about 1, 2, 3, 4, 5, 6, 7, 8, 9, or 10 millimeters, for example. In certain examples, the maximum length scale is selected from about 1 millimeter to about 9 millimeters, such as about 3 millimeters to about 6 millimeters.

When the minimum length scale is a thickness (such as, for example, the thickness of a coin-shaped product), the average thickness may be from about 0.1 millimeters to about 5 millimeters, for example. When the maximum length scale is a thickness (such as, for example, the thickness of a coin-shaped product), the average thickness may be from about 1 millimeter to about 10 millimeters, for example.

The temperature controlled transporter can continue to transport the thermoplastic product to the product collection system after the product is cut to a dimension. In some embodiments, a breaker roll may break up the cut product and release the product from the transporter at an exit point of the transporter. In some cases, the breaker roll may be heated and/or cooled, with temperature control. In some cases, the breaker roll may include a stamp or pattern to aid in the removal of the product from the transporter. In some examples, the breaker roll may contact the surface of the product and create a seam which can be broken or scored. The product can then break at the score as it passes over the edge of the transporter or other subsequent processing step.

The product collection system may separate and/or package the thermoplastic product. The product collection system may include one or more sieves to separate the cut thermoplastic product from process waste. The sieves can include multiple sizes of mesh or orifices to control finished product size and screen out material that is over or under the specified target size. In some examples, the sieves may be connected to an in-process recycling system that can recycle excess material within the process. For example, the product collection system may separate excess glass beads used for the surface treatment from the cut thermoplastic product. Optionally, the system may recycle the glass beads to be discharged again in the process as a surface treatment.

In some examples, the product collection system includes one or more packaging units. The thermoplastic product may be transferred to a packaging unit to be bagged, boxed, or otherwise packaged for future use or transport. The packaging unit may package according to weight or volume of product depending on the product parameters.

In some examples, the discharge rate of the thermoplastic product may be controlled by the level or pressure of the thermoplastic composition in the product hopper. In some examples, the discharge rate of the thermoplastic composition may be controlled by the rate of rotation or reciprocation of the product formation apparatus. In some examples, the discharge rate of the thermoplastic composition may be controlled by the speed of the transporter. In some examples, the discharge rate of the thermoplastic composition may be adjusted according to the size of the outlets of the product formation apparatus. In some examples, the discharge rate of thermoplastic composition may be controlled based on downstream quality parameters.

The method described herein may further comprise a feedback control loop. In some cases, inline quality analysis measurements of the product forming system provide feedback to control or adjust process parameters such as temperature and feed rate to maintain product properties. For example, inline quality analysis of the formed thermoplastic product can be performed and a discharge rate of the formed thermoplastic product from the apparatus adjusted according to an inline quality analysis result. In one example, the temperature of the temperature controlled transporter may be adjusted to provide for desired properties at the cutter. In another example, the temperature of one or more zones of the transporter may be increased or decreased based on resulting depth of the surface treatment. In other examples, the discharge rate or pattern of the surface treatment may be adjusted. In some cases, the system may perform online measurements of color, bead depth, bead deposit pattern, product thickness, product shape, product dimension, product length, product width, product temperature, levelness, and voids using laser measurement, optical cameras, infrared cameras, among other technologies known in the art.

In some embodiments using the methods and compositions described herein, the systems and methods can provide advantages as compared to conventional processes used to make thermoplastic compositions.

FIG. 1 shows a schematic of a method described herein. In some examples, a thermoplastic composition may be supplied to a product feeder 110 and transferred to a product former 120. Once transferred to the former, the composition may be discharged as a formed product onto a transporter 130. Optionally, the product may receive a surface treatment 160 once formed and prior to cutting the product 140. The product can be transferred along a transporter to be cooled and cut to size 140 for further processing or finishing. The product can be transferred to a downstream process 150 for size control, waste separation, and/or packaging.

In some embodiments of the systems and methods described herein, product quality and throughput can be improved compared to a conventional process. For example, in some examples, a thermoplastic product can be produced in less than 10 minutes from the time of initial supply to the feeder. In some cases, a process may produce product in less than 5 minutes. The reduced processing time as compared to conventional systems and methods can result in lower heat history on the product and lower heating costs for processing. In certain examples, the cooling method of the transporter can substantially eliminate product contact with water and eliminate additional processing time for drying. In some cases, the process may reduce or substantially eliminate dust and improve air quality.

Also described herein are systems for producing thermoplastic compositions useful for roadway markings. In some cases, a system producing thermoplastic material for roadway markings can comprise a product feeder configured to transfer the thermoplastic composition, a product formation apparatus configured to receive the thermoplastic composition from the feeder, form a product, and discharge the formed thermoplastic product, a temperature controlled transporter configured to receive, cool, and transport the formed thermoplastic product for further processing, a cutter configured to cut the formed thermoplastic product to a dimension, and a product collection system configured to receive the cut thermoplastic product.

In some examples, the product feeder may be heated to a temperature of between about 150° F. and 850° F. The product formation apparatus may be heated to a temperature of between about 150° F. and 850° F. The temperature of the transporter may be between about −100° F. and 100° F. The temperature controlled transporter may include multiple heating or cooling zones. The temperature controlled transporter may comprise a material with good heat transfer properties, such as steel or aluminum, copper, stainless steel, or other material known to those skilled in the art. The transporter may have an exterior surface that contacts the product and an interior surface that does not contact the product. The exterior surface of the temperature controlled belt may be free of water or other heat transfer fluids or may utilize water or other heat transfer fluids. The interior surface may be cooled or heated in one or more zones to heat or cool the thermoplastic product on the transporter.

In some examples, the collection system can include at least one sieve to separate the cut thermoplastic product from process waste. The collection system may include a packaging unit to package the cut thermoplastic product for transport or future use. A plurality of buckets, a conveyer, fluidized transfer, gravity, or other means may be used to transfer the cut thermoplastic product within the product collection system.

In some examples, the system can include a unit for surface treatment. For example, the system can include a surface treatment dropper configured to discharge surface treatment elements onto the formed thermoplastic product or onto the temperature controlled belt prior to the discharge of the product formation apparatus. For example, the system can include a dropper configured to discharge glass beads, a grit, or other surface element onto the formed thermoplastic product or onto the temperature controlled belt prior to the discharge of the product formation apparatus.

Figure 2:
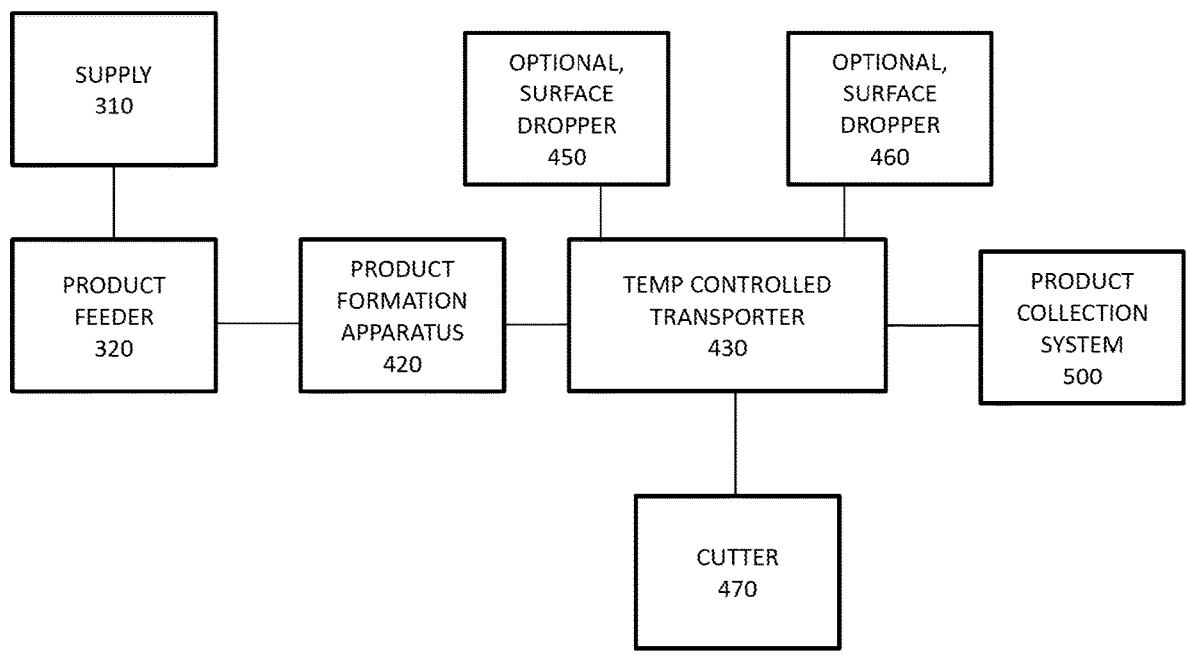
FIG. 2 shows a system for producing a thermoplastic composition used in roadway markings according to one or more examples described herein.

FIG. 2 shows a system for producing a thermoplastic composition used in roadway markings according to one example of the present disclosure. A thermoplastic composition 310 is charged to a product feeder 320. The product feeder 320 discharges thermoplastic composition 310 to a product formation apparatus 420 to form the product and then discharges the formed product to a temperature controlled transporter 430. Optionally, surface treatment materials can be discharged onto the transporter 430 with dropper 450 to be incorporated with the product or discharged directly onto the surface of the product with dropper 460. A cutter 470 can cut the product to a dimension according to a specified product dimension. The thermoplastic product can be transferred to the product collection system 500 for packaging, storage, and/or shipment.

Figure 3:
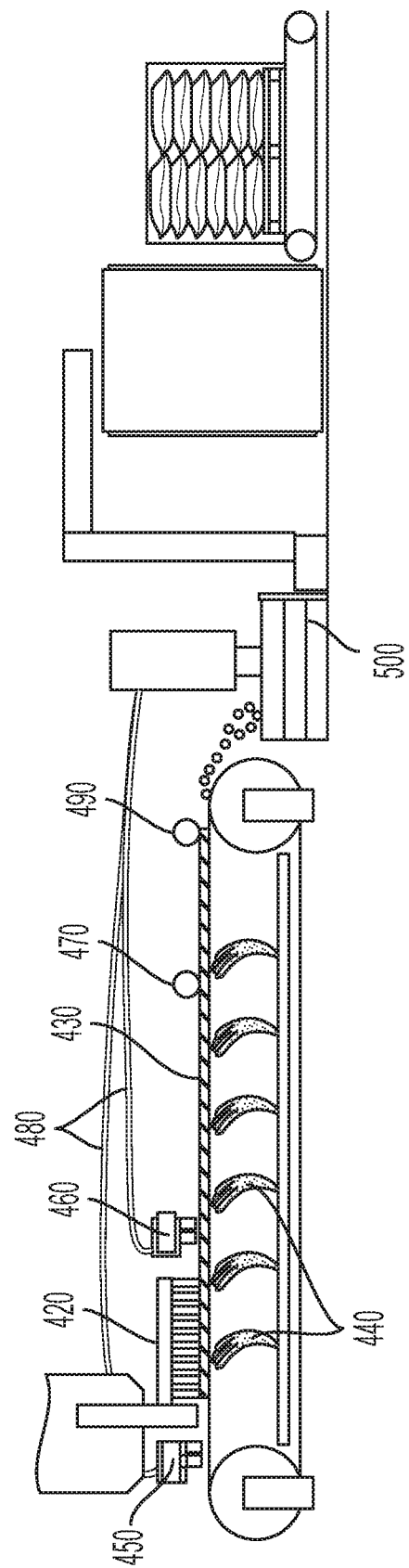
FIG. 3 is an illustrative schematic of a process for producing a thermoplastic composition used in roadway markings according to one or more examples described herein.

FIG. 3 is a side view illustrative schematic of a process to make thermoplastic products used in roadway markings according to one or more examples described herein. In some examples, the product forming system may comprise an extrusion process. The product formation apparatus 420 is positioned over the transporter 430 and discharges the formed product onto transporter 430. The transporter 430 may be heated or cooled. A series of jets 440 can spray a fluid on the interior surface of the transporter 430. The jets 440 can be water or another heat transfer fluid. The temperature can be adjusted as demanded by the process, for example, based on the volume of the fluid sprayed on the interior surface of the transporter or the temperature of the sprayed fluid. One or more surface treatments can be dropped onto the transporter 430 at multiple points. As shown, the surface treatment can optionally be added to the transporter pre-formation by dropper 450 and/or post-formation by dropper 460. The cutter 470 may be positioned along the transporter 430 to cut to the thermoplastic product to a dimension. The thermoplastic product is transferred downstream to a product collection system 500, where the product is sorted for size and quality and packaged. A breaking roller 490 can be used to release the product from the transporter 430. Optionally, the product collection system 500 can include raw material recycling lines 480 to recycle excess surface treatment materials to the droppers 450 or 460.

In some examples, the components of the thermoplastic composition may comprise one or more resins, an antioxidant, one or more copolymers, one or more pigments, sand, calcium carbonate, glass beads, and other additives.

In some examples, a thermoplastic composition may comprise a copolymer, an inorganic filler, a hard resin, and glass beads. In some examples, the composition may further comprise titanium dioxide, at least one pigment, an antioxidant, or other additive.

In some examples, a thermoplastic composition may comprise a copolymer, at least one of a rosin-modified ester or a modified gum rosin, a pigment, a wax, an antioxidant, a light stabilizer, a plasticizer, and an inorganic filler.

In some examples, a thermoplastic composition may comprise at least one copolymer, at least one of a rosin-modified ester or a modified gum rosin, a pigment, and at least one inorganic filler. The composition may further comprise at least one of an antioxidant, a light stabilizer, or titanium dioxide, In some embodiments, the thermoplastic composition comprises at least 3 weight percent polypropylene/polyethylene copolymer, at least 18 weight percent binder, at least 20 percent intermix of inorganic filler, and at least one of the following: at least 1 weight percent of a polyethylene homopolymer wax, at least 1 weight percent alkyd resin and soybean oil mixtures, at least 0.5 weight percent of a UV stabilizing compound, at least 1 weight percent of an alkyd resin modified glyceryl phthalate, at least 1 weight percent of a polyurethane.

In some embodiments, the thermoplastic composition comprises 4-11% copolymer, 4-14% hard resin, 50-90% inorganic filler, 1-10% titanium dioxide, 0-1% antioxidant, 2-10% pigment, and up to 2% other additives.

In some embodiments, the thermoplastic composition described herein comprises 3 to 10 wt. % polyamide resin, 0.7 to 3 wt. % copolymer, 5 to 20 wt. % rosin-modified ester, 0.2 to 1.5 wt. % pigment, up to 5 wt. % wax, up to 0.5 wt. % antioxidant, up to 0.7 wt. % light stabilizer, up to 4 wt. % plasticizer, and 20 to 80 wt. % inorganic filler. In some embodiments, the thermoplastic composition comprises 100% solid materials.

In some embodiments, the thermoplastic composition described herein comprises up to 30 wt. % maleic modified rosin ester, up to 30 wt. % rosin ester (modified and/or unmodified), up to 30 wt. % gum rosin, up to 30 wt. % petroleum based resin, up to 30 wt. % polyamide, up to 10 wt. % wax, up to 10 wt. % copolymers, up to 5 wt. % alkyd oil, up to 5 wt. % castor oil, up to 5 wt. % hydrocarbon-based oil, up to 20 wt. % $TiO_2$, up to 20 wt. % pigment, up to 60 wt. % glass beads, and with the balance an inorganic filler. In some embodiments, the thermoplastic composition comprises 100% solid materials.

In some embodiments, the thermoplastic composition described herein comprises 1 to 10 wt. % rosin resin, 0.5 to 5 wt. % copolymer, 10 to 25 wt. % rosin-modified ester, up to 20 wt. % pigment, up to 10 wt. % wax, up to 5 wt. % plasticizer, 1 to 3 wt. % $TiO_2$, 30 to 50 wt. % glass beads, and 30 to 50 wt. % inorganic filler. In some embodiments, the thermoplastic composition comprises 100% solid materials.

In some embodiments, the thermoplastic composition described herein comprises at least one copolymer in an amount up to 12% (e.g., from 0 to 5%, 0.2 to 2.5%, or from 1 to 6%). In some examples, the thermoplastic composition may include about 0.1%, 0.2%, 0.4%, 0.6%, 0.8%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%. 11%. 11.5%, or 12% copolymer. All are expressed in wt. %. In certain embodiments, the composition may be substantially free of a copolymer. In some embodiments, the copolymer comprises at least one of ethylene vinyl acetate and ethylene maleic anhydride. In some examples, the copolymer comprises a polypropylene/polyethylene copolymer.

In some examples, the thermoplastic composition described herein comprises a hard resin in an amount of from about 2 to about 30% (e.g., from 2 to 20%, from 5 to 25%, or from 10 to 20%). In some examples, the thermoplastic composition may include about 2%, 3%, 4%, 5%, 6%, 7%, 8%, 9%, 10%, 12%, 14%, 16%, 18%, 20%, 22%, 24%, 26%, 28%, or 30% polyamide resin. All are expressed in wt. %. In some embodiments, the hard resin may be a polyamide resin. In some embodiments, the resin comprises at least one of polyolefin elastomers, polypropylene copolymers, styrene-butadiene-styrene (SBS) polymers, styrene-isoprene-styrene (SIS) polymers. The resin may provide toughness, flexibility, and bond strength to the composition, while binding together all the components of thermoplastic composition.

In some embodiments, the thermoplastic composition described herein comprises an inorganic filler in an amount of from about 5 to about 90 wt. % (e.g., from 10 to 50%, from 20 to 50%, or from 40 to 60%). In some examples, the thermoplastic composition may include about 5%, 10%, 20%, 25%, 30%, 35%, 40%, 45%, 50%, 55%, 60%, 65%, 70%, 75%, 80%, 85%, or 90% inorganic filler. All are expressed in wt. %. In some embodiments, the inorganic filler comprises one or more of calcium carbonate, silica, quartzite, marble grit, glass powder, glass cullet, and alumina. In some examples, the inorganic filler may be a binder. The inorganic filler may add bulk to the composition and provide a composition that has greater elongation properties.

In some examples, the thermoplastic composition described herein comprises glass beads in an amount of from about 2% to about 60% (e.g., from 10 to 30%, from 30 to 40%, or from 35 to 50%). In some examples, the thermoplastic composition may include about 2%, 3%, 4%, 5%, 6%, 7%, 8%, 9%, 10%, 12%, 14%, 16%, 18%, 20%, 22%, 24%, 26%, 28%, 30%, 32%, 34%, 36%, 38%, 40%, 42%, 44%, 46%, 48%, 50%, 52%, 54%, 56%, 58%, or 60% glass beads. All are expressed in wt. %. In some embodiments, the glass beads may be an intermix of glass beads. In some embodiments, the glass beads comprise at least one of AASHTO Type I, Type II, Type III, Type IV, Type V, or Type VI glass beads.

In some embodiments, the thermoplastic composition described herein comprises a rosin-modified ester in an amount up to about 40 wt. % (e.g., from 5 to 15%, from 3 to 18%, or 11 to 25%). In some examples, the thermoplastic composition may include about 1%, 2%, 3%, 4% 5%, 6%, 7%, 8%, 9%, 10%, 12%, 14%, 16%, 18%, 20%, 22%, 24%, 26%, 28%, 30%, 32%, 34%, 36%, 38% or 40% rosin-modified ester. All are expressed in wt. %. In certain embodiments, the composition may be substantially free of rosin-modified esters. In some embodiments, modified rosin ester comprises tall oil esters, maleic rosin ester, pentaerythritol rosin ester, glycerol rosin ester, disproportionated rosin ester, hydrogenated rosin, and polymerized rosin.

In some embodiments, the thermoplastic composition described herein comprises an unmodified rosin ester in an amount up to about 30 wt. % (e.g., from 5 to 15%, from 3 to 18%, or 11 to 25%). In some examples, the thermoplastic composition may include about 1%, 2%, 3%, 4% 5%, 6%, 7%, 8%, 9%, 10%, 12%, 14%, 16%, 18%, 20%, 22%, 24%, 26%, 28%, or 30% unmodified rosin ester.

In some embodiments, the thermoplastic composition described herein comprises a modified gum rosin in an amount up to about 40 wt. % (e.g., from 5 to 25%, from 2 to 15%, or 11 to 25%). In some examples, the thermoplastic composition may include about 1%, 2%, 3%, 4% 5%, 6%, 7%, 8%, 9%, 10%, 12%, 14%, 16%, 18%, 20%, 22%, 24%, 26%, 28%, 30%, 32%, 34%, 36%, 38% or 40% modified gum rosin. All are expressed in wt. %. In certain embodiments, the composition may be substantially free of modified gum rosins. In some embodiments, modified gum rosin comprises modified gum rosin comprises glyceryl hydrogenated rosin, rosin modified phenolic resin, pentaerythrityl rosin, glyceryl rosin, disproportionated rosin, polymerized rosin and hydrogenated rosin.

In some embodiments, the thermoplastic composition described herein comprises one or more pigments in an amount of from about 0.1 to about 20 wt. % (e.g., from 0.2 to 1.2%, 0.5 to 2%, or 4 to 15%). In some examples, the thermoplastic composition may include about 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, or 20% pigment. All are expressed in wt. %. In some embodiments, the pigment may comprise carbon black or titanium dioxide. The pigment may provide color and opacity to the composition. In some examples, the composition may comprise more than one pigment.

In some embodiments, the thermoplastic composition described herein comprises wax in an amount of about up to 20 wt. % (e.g., from 0.5 to 5%, from 1 to 8%, or 5 to 10%). In some examples, the thermoplastic composition may include about 0.5%, 1%, 2%, 3%, 4%, 5%, 6%, 7%, 8%, 9%, 10%, 12%, 14%, 16%, 18%, or 20% wax. All are expressed in wt. %. In some embodiments, the wax may comprise polyethylene wax, functionalized PE wax, polypropylene wax and similar formulations. In some examples, the composition may be substantially free of wax or wax-free.

In some embodiments, the thermoplastic composition described herein comprises an antioxidant in an amount of about up to 3 wt. % (e.g., from 0.1 to 0.4%, from 0.8 to 2%, or 0 to 3%). In some examples, the thermoplastic composition may include about 0.05%, 0.1%, 0.15%, 0.2%, 0.4%, 0.6%, 0.8%, 1%, 1.2%, 1.4%, 1.6%, 1.8%, 2%, 2.2%, 2.4%, 2.5%, 2.6%, 2.7%, 2.8%, 2.9%, or 3% antioxidant. All are expressed in wt. %. In certain embodiments, the composition may be substantially free of an antioxidant.

In some embodiments, the thermoplastic composition described herein comprises a light stabilizer in an amount of about up to 3.5 wt. % (e.g., from 0.2 to 1.6%, from 0.6 to 2.5%, or 0 to 3%). In some examples, the thermoplastic composition may include about 0.05%, 0.1%, 0.2%, 0.4%, 0.6%, 0.8%, 1%, 1.2%, 1.4%, 1.6%, 1.8%, 2%, 2.2%, 2.4%, 2.6%, 2.8%, 3%, 3.2%, 3.4%, or 3.5% light stabilizer. All are expressed in wt. %. In certain embodiments, the composition may be substantially free of a light stabilizer. In some embodiments, the light stabilizer comprises a hindered amine, or hindered amine light stabilizer (HALS).

In some embodiments, the thermoplastic composition described herein comprises a plasticizer in an amount of about up to 10 wt. % (e.g., from 1 to 4%, from 1 to 5%, or from 3 to 7%). In some examples, the thermoplastic composition may include about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% plasticizer. All are expressed in wt. %. In some embodiments, the plasticizer comprises one or more of castor oils, other naturally-occurring oils, di-isononyl phthalate, or other phthalates plasticizers. The plasticizer may provide toughness, flexibility, and bond strength to the composition, while binding together all the components of thermoplastic composition.

In some examples, the composition may further comprise additives, for example at least one of a rheology modifier, a wetting and spreading agent, a leveling agent, a conductivity additive, an adhesion promoter, an anti-blocking agent, an anti-cratering agent and anti-crawling agent, an anti-freezing agent, a corrosion inhibitor, an anti-static agent, a flame retardant and intumescent additive, a dye, an optical brightener and fluorescent additive, a UV absorber and light stabilizer, a chelating agent, a cleanability additive, a cross-linking agent, a flatting agent, a flocculant, a humectant, an insecticide, a lubricant, an odorant, an oil, a wax and slip aid, a soil repellant, a stain resisting agent, and or combinations thereof. In some examples, the composition may further comprise a surface treatment, such as a drop-on coating of glass beads.

Illustrative Embodiments of Suitable Systems and Methods

As used below, any reference to methods, products, or systems is understood as a reference to each of those methods, products, or systems disjunctively (e.g., "Illustrative embodiment 1-4 is understood as illustrative embodiment 1, 2, 3, or 4.").

Illustrative embodiment 1 is a method for producing a thermoplastic product for roadway markings comprising: supplying a thermoplastic composition to a product feeder, transferring the thermoplastic composition from the product feeder to a product formation apparatus, discharging a formed thermoplastic product from the product formation apparatus onto a temperature controlled transporter, and collecting the thermoplastic product in a product collection system.

Illustrative embodiment 2 is the method of any preceding or subsequent illustrative embodiment, further comprising cutting the formed thermoplastic product to a dimension.

Illustrative embodiment 3 is the method of any preceding or subsequent illustrative embodiment, further comprising adding a surface treatment to the formed thermoplastic product.

Illustrative embodiment 4 is the method of any preceding or subsequent illustrative embodiment, wherein the surface treatment is dropped onto the formed thermoplastic product prior to cutting the formed thermoplastic product.

Illustrative embodiment 5 is the method of any preceding or subsequent illustrative embodiment, wherein the surface treatment is positioned on the temperature controlled transporter prior to discharging the formed thermoplastic product such that the formed thermoplastic product is discharged onto the surface treatment.

Illustrative embodiment 6 is the method of any preceding or subsequent illustrative embodiment, wherein the surface treatment comprises glass beads, glass particles, grit, or other additive.

Illustrative embodiment 7 is the method of any preceding or subsequent illustrative embodiment, wherein the formed thermoplastic product comprises at least one of a plurality of ribbons, a plurality of dots, a plurality of pellets, or a sheet.

Illustrative embodiment 8 is the method of any preceding or subsequent illustrative embodiment, wherein a maximum width of the plurality of ribbons or dots ranges from 0.5 mm to 100 mm.

Illustrative embodiment 9 is the method of any preceding or subsequent illustrative embodiment, wherein a maximum width of the sheet ranges from 25 mm to 1500 mm.

Illustrative embodiment 10 is the method of any preceding or subsequent illustrative embodiment, wherein the temperature controlled transporter comprises a plurality of temperature zones.

Illustrative embodiment 11 is the method of any preceding or subsequent illustrative embodiment, wherein the temperature controlled transporter comprises at least one of steel, aluminum, or copper.

Illustrative embodiment 12 is the method of any preceding or subsequent illustrative embodiment, wherein an exterior surface of the temperature controlled transporter is substantially free of water or other heat transfer fluids.

Illustrative embodiment 13 is the method of any preceding or subsequent illustrative embodiment, wherein an interior surface of the temperature controlled transporter is contacted with water or other heat transfer fluid or medium.

Illustrative embodiment 14 is the method of any preceding or subsequent illustrative embodiment, wherein a temperature of the thermoplastic composition in the product feeder is greater than a temperature of the cut thermoplastic product.

Illustrative embodiment 15 is the method of any preceding or subsequent illustrative embodiment, wherein the formed thermoplastic product is cut to a dimension using a knife or cutting roll.

Illustrative embodiment 16 is the method of any preceding or subsequent illustrative embodiment, wherein the product collection system separates the cut thermoplastic product from process waste.

Illustrative embodiment 17 is the method of any preceding or subsequent illustrative embodiment, wherein the product collection system recycles the process waste.

Illustrative embodiment 18 is the method of any preceding or subsequent illustrative embodiment, wherein the product collection system packages the cut thermoplastic product.

Illustrative embodiment 19 is the method of any preceding or subsequent illustrative embodiment, wherein the product feeder is heated to a temperature of between 150° F. and 850° F.

Illustrative embodiment 20 is the method of any preceding or subsequent illustrative embodiment, wherein the product formation apparatus is heated to a temperature of between 150° F. and 850° F.

Illustrative embodiment 21 is the method of any preceding or subsequent illustrative embodiment, wherein the thermoplastic composition comprises: at least 3 weight percent polypropylene/polyethylene copolymer, at least 18 weight percent binder, at least 20 percent intermix of inorganic filler, and at least one of the following: at least 1 weight percent of a polyethylene homopolymer wax, at least 1 weight percent alkyd resin and soybean oil mixtures, at least 0.5 weight percent of a UV stabilizing compound, at least 1 weight percent of an alkyd resin modified glyceryl phthalate, or at least 1 weight percent of a polyurethane.

Illustrative embodiment 22 is the method of any preceding or subsequent illustrative embodiment, wherein the thermoplastic composition further comprises glass beads.

Illustrative embodiment 23 is the method of any preceding or subsequent illustrative embodiment, further comprising performing inline quality analysis of the formed thermoplastic product and adjusting a discharge rate of the formed thermoplastic product from the apparatus according to an inline quality analysis result.

Illustrative embodiment 24 is a system for producing thermoplastic material for roadway markings comprising: a product feeder configured to transfer a thermoplastic composition, a product formation apparatus configured to receive the thermoplastic composition from the feeder and discharge a formed thermoplastic product, a temperature controlled transporter configured to receive, cool, and transport the formed thermoplastic product for further processing, and a product collection system configured to receive the thermoplastic product.

Illustrative embodiment 25 is the system of any preceding or subsequent illustrative embodiment, further comprising a cutter configured to cut the formed thermoplastic product to a dimension.

Illustrative embodiment 26 is the system of any preceding or subsequent illustrative embodiment, wherein the transporter is heated or cooled to a temperature of between −100° F. and 100° F.

Illustrative embodiment 27 is the system of any preceding or subsequent illustrative embodiment, wherein the temperature controlled transporter comprises multiple heating or cooling zones.

Illustrative embodiment 28 is the system of any preceding or subsequent illustrative embodiment, wherein the temperature controlled transporter comprises steel, aluminum, or copper.

Illustrative embodiment 29 is the system of any preceding or subsequent illustrative embodiment, wherein an exterior surface of the temperature controlled transporter is free of water or other heat transfer fluids.

Illustrative embodiment 30 is the system of any preceding or subsequent illustrative embodiment, wherein the product collection system comprises a plurality of buckets or a belt.

Illustrative embodiment 31 is the system of any preceding or subsequent illustrative embodiment, wherein the product collection system comprises at least one sieve to separate a cut thermoplastic product from process waste.

Illustrative embodiment 32 is the system of any preceding or subsequent illustrative embodiment, further comprising a glass bead dropper configured to discharge glass beads onto the formed thermoplastic product or onto the temperature controlled transporter prior to the discharge of the product formation apparatus.

While this specification describes the composition useful for application to a roadway, a person of ordinary skill in the art would understand that the compositions can be applied to other substrates. Some non-limiting examples of substrates include pavement, roads, parking lots, parking decks, parking blocks, traffic blocks, ramps, bridges, airport runways, docks, tunnels, sidewalks, parks, plazas, green spaces, decorative spaces, floor surfaces, walls, ceilings, and doors. Typical but non-limiting examples of substrate materials include asphalt, concrete, and cement.

While this specification describes thermoplastic compositions useful for application to a roadway, a person of ordinary skill in the art would understand that the methods and systems described herein can be utilized for other thermoplastic processes that produce pellets or drop forms. The formed pellets can be packaged and transported or stored for later use, including melting as raw material in a product formation or extrusion process.

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted.

As used herein, the meaning of "a," "an," and "the" includes singular and plural references unless the context clearly dictates otherwise.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. A method for producing a thermoplastic product for roadway markings comprising:
    supplying a thermoplastic composition to a product feeder;
    transferring the thermoplastic composition from the product feeder to a product formation apparatus;
    discharging a formed thermoplastic product from the product formation apparatus onto a temperature controlled transporter;
    contacting the surface of the formed product with a breaker roll; and
    collecting the thermoplastic product in a product collection system.

2. The method of claim 1, further comprising cutting the formed thermoplastic product to a dimension.

3. The method of claim 2, further comprising adding a surface treatment of glass beads to the formed thermoplastic product prior to cutting the formed thermoplastic product.

4. The method of claim 1, further comprising adding a surface treatment of glass beads to the formed thermoplastic product.

5. The method of claim 4, wherein the glass beads are positioned on the temperature controlled transporter prior to discharging the formed thermoplastic product such that the formed thermoplastic product is discharged onto the glass beads.

6. The method of claim 1, wherein the formed thermoplastic product comprises at least one of a plurality of ribbons, a plurality of dots, a plurality of pellets, or a sheet.

7. The method of claim 1, wherein the temperature controlled transporter comprises a plurality of temperature zones.

8. The method of claim 1, wherein the temperature controlled transporter comprises at least one of steel, aluminum, or copper.

9. The method of claim 1, wherein an interior surface of the temperature controlled transporter is contacted with water or other heat transfer fluid.

10. The method of claim 1, wherein the product formation apparatus is heated to a temperature of between 150° F. and 850° F.

11. The method of claim 1, wherein the thermoplastic composition comprises:
   at least 3 weight percent polypropylene/polyethylene copolymer;
   at least 18 weight percent binder;
   at least 20 percent intermix of inorganic filler; and
   at least one of the following:
      at least 1 weight percent of a polyethylene homopolymer wax,
      at least 1 weight percent alkyd resin and soybean oil mixtures,
      at least 0.5 weight percent of a UV stabilizing compound,
      at least 1 weight percent of an alkyd resin modified glyceryl phthalate, or
      at least 1 weight percent of a polyurethane.

12. The method of claim 11, wherein the thermoplastic composition further comprises glass beads.

13. The method of claim 1, further comprising performing inline quality analysis of the formed thermoplastic product and adjusting a discharge rate of the formed thermoplastic product from the product formation apparatus according to an inline quality analysis result.

14. A system for producing thermoplastic material for roadway markings comprising:
   a product feeder configured to transfer a thermoplastic composition;
   a product formation apparatus configured to receive the thermoplastic composition from the product feeder and discharge a formed thermoplastic product, wherein the formed thermoplastic product is discharged from the product formation apparatus at a temperature of at between 150° F. and 850° F.;
   a temperature controlled transporter configured to receive, cool, and transport the formed thermoplastic product for further processing;
   a breaker roller configured to contact the surface of the formed thermoplastic product to score or break the formed thermoplastic product; and
   a product collection system configured to receive the thermoplastic product.

15. The system of claim 14, further comprising a cutter configured to cut the formed thermoplastic product to a dimension.

16. The system of claim 14, wherein the temperature controlled transporter comprises at least one heating or cooling zone configured to adjust a product contact surface of the temperature controlled transporter to a temperature of between −100° F. and 100° F.

17. The system of claim 16, wherein the temperature controlled transporter comprises multiple heating or cooling zones.

18. The system of claim 14, wherein the temperature controlled transporter comprises steel, aluminum, or copper.

19. The system of claim 14, wherein a product contact surface of the temperature controlled transporter is free of water or other heat transfer fluid.

20. The system of claim 14, further comprising at least one glass bead dropper configured to discharge glass beads onto the formed thermoplastic product or onto the temperature controlled transporter prior to the discharge of the product formation apparatus.

* * * * *